United States Patent [19]

Cote et al.

[11] Patent Number: 4,969,743
[45] Date of Patent: Nov. 13, 1990

[54] FARADAY MAGNET FOR THE REDUCTION OF MULTI-OSCILLATOR BIAS THERMAL SENSITIVITY

[75] Inventors: Laurence G. Cote, Thousand Oaks; Edward Kanegsberg, Pacific Palisades; Donald Frederick, Canoga Park, all of Calif.

[73] Assignee: Litton Systems, Inc., Woodland Hills, Calif.

[21] Appl. No.: 202,999

[22] Filed: Jun. 6, 1988

[51] Int. Cl.$^5$ ............................................. G01C 19/64
[52] U.S. Cl. .................................... 356/350; 372/94
[58] Field of Search .......................... 356/350; 372/94

[56] References Cited

U.S. PATENT DOCUMENTS 4,470,701  9/1984  Smith ............................... 356/350
4,548,501 10/1985  Smith et al. ..................... 356/350

Primary Examiner—Vincent P. McGraw
Assistant Examiner—S. A. Turner
Attorney, Agent, or Firm—Poms, Smith, Lande & Rose

[57] ABSTRACT

Disclosed herein is a ring laser gyroscope having a non-reciprocal polarization rotation device such as a Faraday rotator configured to provide, through use of a Faraday magnet, a relatively uniform magnetic field across the profile of the Faraday rotator. By providing a uniform magnetic field across the diameter of the Faraday rotator, the magnetic lensing effects are reduced and the thermal sensitivity of the gyroscope's bias is substantially reduced.

6 Claims, 2 Drawing Sheets

FARADAY MAGNET FOR THE REDUCTION OF MULTI-OSCILLATOR BIAS THERMAL SENSITIVITY

BACKGROUND OF THE INVENTION

1. Field of the Invention

This invention relates to ring laser gyroscopes; and, in particular, to four mode multi-oscillator ring laser gyroscopes having a non-reciprocal polarization rotator which incorporates a very uniform, low gradient magnetic field.

2. Description of the Related Art

Since its introduction in the early 1960s, the ring laser gyroscope has been developed as a logical replacement for the mechanical gyroscope for use in all manner of inertial guidance systems. Heretofore, the basic two mode ring laser gyroscope has been developed which has two independent electromagnetic waves oscillating in an optical ring cavity. When the ring is stationary, no rotation is indicated. As the ring cavity is rotated about its central axis, the counter-rotating waves interact with one another so that a beat frequency is developed. A linear relationship between the beat frequency and the rotation rate of the cavity with respect to the inertial frame of reference may be established. Ideally, the rotation rate is proportional to the beat note. In this manner, a gyroscope is theoretically produced having no moving parts. In practice, however, the two mode laser gyro often must be mechanically dithered to keep the counter-rotating traveling waves from locking at low rotation rates.

In an effort to solve this lock-in problem, non-planar ring cavities have been designed containing more than one pair of counter-rotating modes. These multi-oscillator ring laser gyros have been developed to achieve the goal of an accurate gyroscope having no moving parts. Even the multi-oscillator ring laser gyro requires the use of a non-reciprocal polarization rotation device (such as a Faraday rotator) to achieve the splitting of the light within the ring cavity into two pair of counter-rotating modes. Generally, the multi-oscillator ring laser gyro is divided into a pair of right circularly polarized and left circularly polarized waves. The right circular polarized waves are split by the Faraday rotator into clockwise and anticlockwise modes. Likewise, the left circularly polarized waves are split by the rotator into clockwise and anticlockwise modes.

The ring laser gyroscope is an active device; it sustains laser light by providing its own optical gain over a small range of optical frequencies. The gain profile can be considered to be a bell-shaped distribution of optical amplification over this range of optical frequencies. The standard spectrum of laser light in a multi-oscillator ring laser gyro contains right and left circularly polarized modes. Two laser modes, of opposite circular polarity, are established on opposite sides of the center frequency of the cavity's gain profile.

Each of these two circularly polarized light beams is separated into two counterpropagating beams, at frequencies distinct from one another, by the non-reciprocal polarization rotation provided by the Faraday rotator assembly. These four beams, then, constitute the four mode spectrum of the multi-oscillator laser gyro.

This non-reciprocal polarization rotation induces for the two circular polarizations an equal and opposite frequency splitting between counterpropagating modes. This is to say, a beam of one circular polarization ends up with its clockwise propagating mode at a higher frequency than its counterclockwise propagating mode, and light of the other polarization has its counterclockwise mode at a higher frequency that its clockwise mode. The frequency separation between the counterpropagating modes is, ideally, equal for the two circular polarizations.

Since a rotation of the cavity will cause opposite frequency shifts in the clockwise and counterclockwise propagating modes, any rotation of the gyroscope will cause the frequency separation between counterpropagating modes to increase for light of one circular polarization, while the frequency separation between counterpropagating modes decreases for light of the other circular polarization. It is this difference in frequency separations of counterpropagating modes which is, ideally, proportional to the rotation rate of the cavity.

The exact frequencies, $\lambda$, of these modes are determined by the apparent optical path length, L, of the cavity, through $L=N\lambda$ for some integer N. The apparent optical path length is, in turn, effected by the apparent index of refraction of the gain medium. The apparent indices of refraction seen by the four modes are different from one another, and depend on the optical gain available at a particular frequency and on the optical loss experienced by the lasing mode. If the gain or loss of a laser mode is altered thereby changing the apparent index of refraction and optical path length in the gain medium, the lasing frequency of the mode will adjust itself to remain consistent with the $L=N\lambda$ relationship.

Differences in optical losses among the four beams in the cavity can affect the frequency separations between counterpropagating beams. Non-uniform magnetic fields in the Faraday rotator assembly have been identified as a source of differences in optical loss among the laser modes which cause a difference in the frequency separations of counterpropagating modes of the two circular polarizations. This effect is indistinguishable from the effects of rotation of the cavity.

One can measure the difference in frequency separations of counterpropagating beams while the gyroscope is subject to rotation of a known angular rate. A difference in frequency separations of counterpropagating modes that is not due to the known rotation rate can be taken as being the bias of the gyroscope. Unfortunately, the bias due to non-uniform magnetic fields heretofore used in the Faraday rotator assembly changes as the temperature of the gyroscope changes. In fact, these non-uniform magnetic fields have been identified as being among the largest sources of temperature sensitivity of multi-oscillator ring laser gyroscope bias.

In actual operation of the multi-oscillator ring laser gyro, however, the bias is not stable over all operating conditions. For example, over a wide temperature range thermal bias sensitivity is exhibited due to the mode pulling effects of the media, as well as the Faraday rotator, as it acts to split each set of circularly polarized light into its respective clockwise and anticlockwise modes.

What is needed is a non-reciprocal polarization rotation device which may be used to split each set of right and left circularly polarized waves into respective clockwise and anticlockwise modes without causing undue differential mode pulling. Heretofore, when a Faraday rotator has been used to perform a non-reciprocal polarization rotation of the propagating waves within the ring laser cavity, the helicity factor of the Faraday rotator causes opposite concave and convex lensing effect depending upon the helicity of the light which approaches the Faraday rotator glass. Over a wide temperature range, this helicity effect changes so that the mode pulling that occurs is not uniform and may not be factored out, as a constant bias, in any rotation rate calculation,

SUMMARY OF THE INVENTION

This invention is directed to a multi-oscillator ring laser gyroscope having a closed pathway providing reciprocal image rotation of a plurality of electromagnetic waves propagating within the pathway and a non-reciprocal polarization rotation device including a uniform magnetic field source in order to reduce thermal bias sensitivity.

The multi-oscillator ring laser gyroscope of the present invention may be a partially gas filled active medium laser configured in a non-planar structure. Non-reciprocal polarization rotation of counter-propagating electromagnetic radiation may be achieved by a Faraday rotator which is associated with a low gradient magnetic field. The Faraday rotator includes a carrier piece for mounting an amorphous glass disc within a central chamber formed within a cylindrically shaped permanent magnet. The cylindrically shaped permanent magnet may have at least three disc magnets stacked one on another, the middle magnet having the greatest central aperture. The glass disc is positioned within the center of the middle magnet and the entire Faraday magnet assembly.

DETAILED DESCRIPTION OF THE PREFERRED EMBODIMENT

Figure 1:
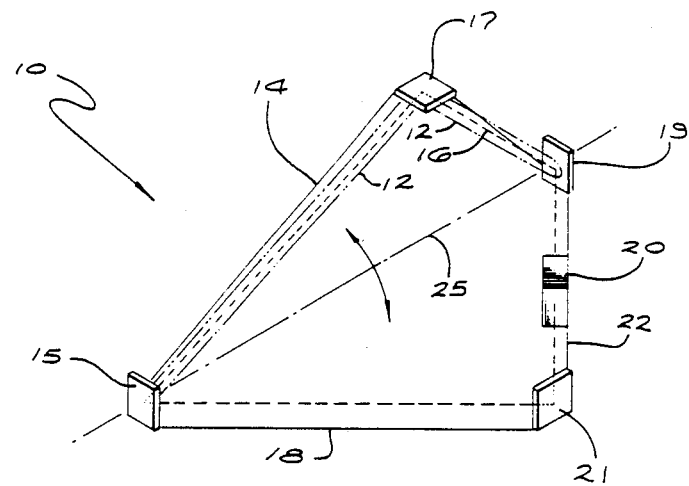
FIG. 1 is a schematic diagram of the multi-oscillator ring laser gyroscope of this invention.
Figure 2:
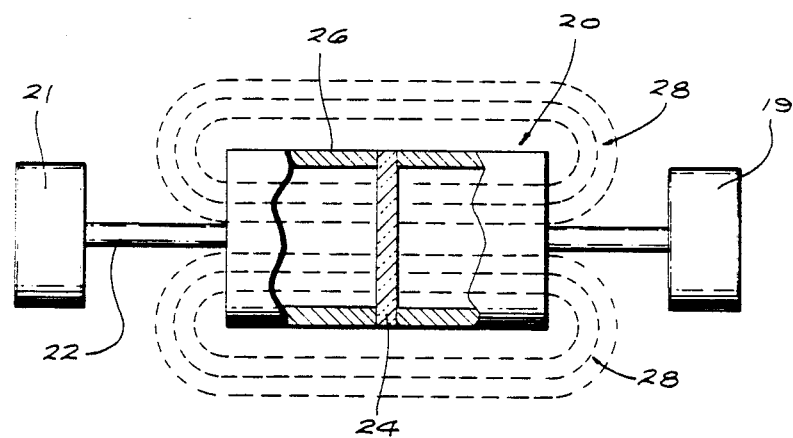
FIG. 2 shows an enlarged view in schematic of the low gradient Faraday rotator within a single leg of the ring laser gyro cavity.

With particular reference to FIGS. 1 and 2, a non-planar ring laser gyroscope is shown generally at 10. In the preferred embodiment, the ring laser gyroscope 10 is formed in a heavy plastic or glass block which holds the gyroscopic components and defines the ring laser cavity. The active region 12 of the ring laser 10 is defined along legs 14 and 16 of the ring laser gyroscope. Leg 14 traverses the area between mirrors 15 and 17. Leg 16 completes the path between mirror 17 and mirror 19. Leg 18 is between mirrors 15 and 21; while leg 22, between mirrors 19 and 21, completes the laser cavity. As with most ring laser gyroscopes, the active medium within the laser cavity is a plasma gas activated by a cathode and one or more anodes. The plasma gas when excited gives rise to the lasing phenomena. As the non-planar ring laser gyroscope 10 rotates about its axis, in ideal conditions, the small amount of light which passes through a semi-transparent mirror 21 shows a beat frequency difference which is translatable into rotational information.

A Faraday rotator 20 provides non-reciprocal polarization rotation along leg 22 of the ring laser gyro cavity. The operation of the Faraday rotator 20 of this invention is to split both the left and right circularly polarized light into counter-propagating components both clockwise and anticlockwise. The right and left circular polarization of the light is achieved by the non-planarity of the multi-oscillator gyroscope. In the preferred embodiment, the four leg ring laser gyro 10 of this invention forms a folded rhombus along line 25 to provide out of plane alignment of the mirrors 15, 17, 19 and 21. It is this out-of-plane geometry that allows reciprocal image rotation of the light within the laser cavity.

With reference to FIG. 2, a close-up view of the Faraday rotator 20 of this invention shows a piece of amorphous glass 24 positioned coaxially and perpendicularly within leg 22 of the laser path. Surrounding and containing the glass disc 24 is a cylindrical Faraday magnet 26. As schematically shown, the Faraday magnet 26 is substantially longer than the thickness of the Faraday glass 24. In this manner, a low gradient magnetic field 28 is provided so that the spacing between field lines across the diameter of the glass 24 is relatively uniform.

The effect of the Faraday rotator 20 is to produce a different index of refraction for light approaching the rotator with a first helicity than for light approaching with a second, opposite helicity. The helicity of a beam of light is determined by the direction, with respect to a fixed, inertial reference frame, of the rotation of the beam's electric field vector about its propagation axis. The left circularly polarized, clockwise propagating beam and the right circularly polarized, counterclockwise propagating beam share the same sense of helicity, which is of an opposite sense from the helicity shared by the other two modes in the cavity. Since the magnitude of the apparent change in index of refraction is proportional to the strength of the magnetic field, radial non-uniformities in magnetic field strength produce radial non-uniformities in apparent refractive index. This radial variation in apparent refractive index makes the rotator act like a lens. Since the apparent change in refractive index is of opposite sign for beams of opposite helicity, a given radial magnetic field profile will produce opposite lensing effects for beams of opposite helicity. These different lensing effects produce different diameters for beams of opposite helicity, and hence beams of opposite helicity experience different aperture losses within the cavity. This difference in optical loss will produce a bias in the gyroscope. Thermal effects on mechanical cavity dimensions, and on magnet strength and rotator Verdet constant, will then change this difference in optical losses and provide a thermal sensitivity to the gyro bias. If the magnetic field is uniform, the beams of opposite helicity will be subject to optical losses which are much more similar to one another, and which will change in a manner much more similar to one another as the temperature of the gyroscope changes. A major source of temperature sensitivity of the gyroscope's bias is thereby eliminated.

Figure 3:
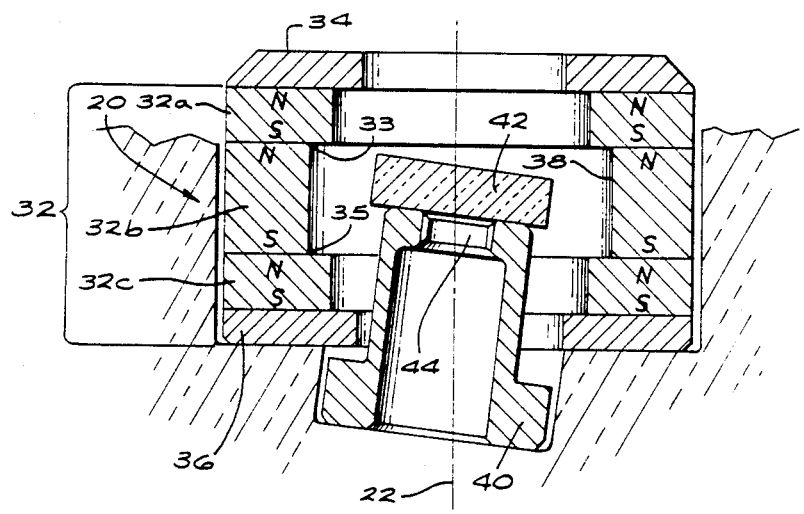
FIG. 3 shows a cross-sectional view of the preferred embodiment of the Faraday magnet assembly of this invention.

A particular preferred embodiment of the Faraday rotator assembly 20 of this invention is shown in FIG. 3. In cross-section, a cylindrically shaped magnetic section 32 is secured within an iron metal frame 34 and 36. The frame 34 and 36 and magnet 32 are positioned along the axis of leg 22 of the ring laser gyroscope 10 (FIG. 1). For ease of manufacture, the magnetic assembly 32 is comprised of three disc magnets 32a, 32b and 32c. The central magnet, 32b, has an aperture which is larger than that of the outer magnets 32a and 32c. The magnets are aligned with alternative poles (N and S) facing one another, so that an overall concentrated magnetic flux is provided. The magnetic assembly 32 could alternatively be a one-piece cylindrical design. The iron frame 34 and 36 may be made from vanadium permendur, for example. The magnetic discs which comprise the magnetic assembly 32 are preferably made from samarium cobalt, while each disc is secured to the other by layers 33 and 35 of indium.

The iron frame 34 and 36 provides a pathway for the magnetic flux 28 (FIG. 2) which passes through the central axis of an aperture 38. Seated within the central aperture 38 is a carrier piece 40. The carrier piece 40 defines a central aperture 44 through which light may pass to enter an amorphous glass piece 42 mounted upon the carrier piece 40. The glass piece 42 of the Faraday rotator 20 is preferably positioned within the aperture 38 midway along the length of the second central magnetic disc 32b. In this manner, a Faraday rotator assembly 30 is provided with a maximum strength, low gradient uniform magnetic field.

Figure 4:
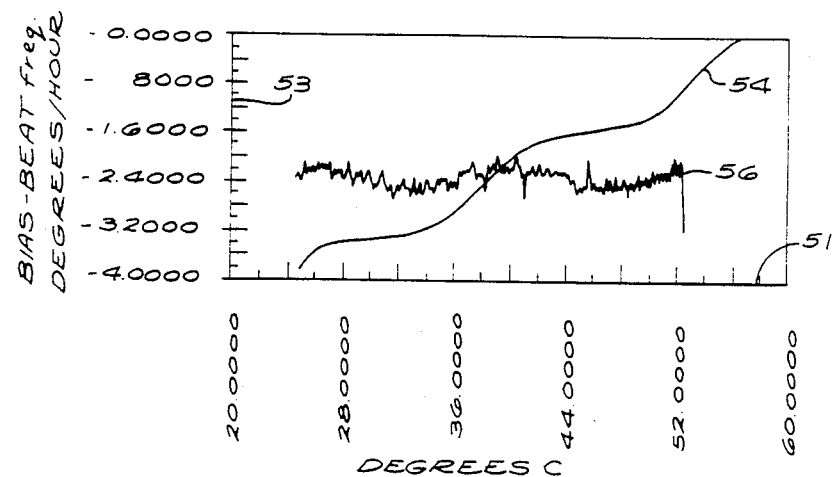
FIG. 4 is a graphic representation of bias plotted against temperature degree Centigrade, for both conventional gyroscopes and the low gradient gyroscope of this invention.

FIG. 4 reveals test results using the Faraday rotator assembly 20 as designed and shown in FIG. 3, compared and contrasted with conventional Faraday rotator design operation. FIG. 4 shows a wide temperature range in degrees Centigrade along the horizontal axis 51. Vertical axis 53 is a plot of bias or the amount of offset of the beat frequency that is provided to the system by the differential loss and mode pulling due to the lensing effect of a conventional Faraday rotator. Graphic plot 54 shows that over a wide range of temperature, the bias changes substantially in a conventionally designed nonuniform magnet Faraday rotator assembly. This change in bias with temperature prevents the designer from assuring that accurate measurements of rotation derived from beat frequency are obtained. In contrast, graphic plot 56 shows a relatively flat curve over a wide range of temperature indicating that a bias which is stable over a wide temperature range is provided by the low gradient Faraday rotator assembly 20 as disclosed in this application. This uniformity of bias over a wide range of temperature allows the bias to be subtracted from the beat frequency so that a rotation rate may be determined, unlike the unpredictability exhibited in curve 54 representative of the prior art.

While a single preferred embodiment has been disclosed, together with experimental test information and data indicating the nature of the problem solved by the subject invention, other alternative embodiments are available which will also provide a uniform low gradient magnetic field profile across the diameter of the glass piece of the Faraday rotator. For example, a relatively large cylinder of a uniform aperture dimension could also provide the glass piece of a Faraday rotator with a low gradient uniform magnetic field. Thus, it is the intention of the applicant that equivalent embodiments directed to a uniform magnetic field through a Faraday rotator are intended to be covered within the scope of the appended claims.

What is claimed is:

1. In a multi-oscillator ring laser gyroscope having a closed pathway for providing reciprocal image rotation of a plurality of electromagnetic waves propagating with said pathway and a Faraday rotator for providing non-reciprocal polarization rotation of said plurality of electromagnetic waves, the improvement comprising:
    a low gradient magnetic field formed by a plurality of magnets including a central magnet, each having a passageway therein;
    said Faraday rotator having a generally flat surface and finite thickness mounted within said passageway of said central magnet and thus within said low gradient magnetic field for creating a radially uniform field across said generally flat surface and through said finite thickness of said Faraday rotator wherein said gyroscope is less sensitive to thermal variations.

2. In a multi-oscillator ring laser gyroscope having a closed pathway for providing reciprocal image rotation of a plurality of electromagnetic waves propagating within said pathway and a Faraday rotator for providing non-reciprocal polarization rotation of said plurality of electromagnetic waves, the improvement comprising:
    a low gradient magnetic field formed by a magnet having a passageway therein;
    said Faraday rotator having a generally flat surface and finite thickness mounted within said passageway of said magnet and thus within said low gradient magnetic field for creating a radially uniform field across said generally flat surface and through said finite thickness of said Faraday rotator wherein said gyroscope is less sensitive to thermal variations;
    said low gradient magnetic field formed by at least one cylindrical permanent magnet having a longitudinal passage therethrough; and
    said Faraday rotator mounted centrally within said longitudinal passage of said cylindrical permanent magnet.

3. A multi-oscillator ring laser gyroscope, as claimed in claim 2, wherein:
    said Faraday rotator comprises a thin piece of amorphous glass mounted within said cylindrical permanent magnet.

4. A multi-oscillator ring laser gyroscope as claimed in claim 2, additionally comprising:
    said low gradient magnetic field formed by said at least one cylindrical permanent magnet including a stack of at least three cylindrical permanent magnets each having a longitudincal passage therethrough; and
    said Faraday rotator mounted centrally within the longitudinal passage of the middle magnet of said at least three cylindrical permanent magnets.

5. A multi-oscillator ring laser gyroscope, as claimed in claim 4, wherein:
    said middle magnet of said at least three magnets has a longitudinal passage that is larger than the passages of said other magnets; and
    said magnets are stacked with alternating poles facing one another.

6. A multi-oscillator ring laser gyroscope, as claimed in claim 2, wherein:
    said Faraday rotator is mounted in a non-lasing medium of said gyroscope.

* * * * *